United States Patent [19]

Wrasman

[11] 3,961,770
[45] June 8, 1976

[54] PLUG VALVE

[75] Inventor: Thomas J. Wrasman, Louisville, Ky.

[73] Assignee: Celanese Corporation, New York, N.Y.

[22] Filed: Feb. 7, 1975

[21] Appl. No.: 548,157

Related U.S. Application Data

[63] Continuation-in-part of Ser. No. 394,037, Sept. 4, 1973.

[52] U.S. Cl. .............................. 251/315; 251/172; 29/157.1 R; 285/DIG. 16; 264/242
[51] Int. Cl.² ............................................ F16K 5/00
[58] Field of Search ........... 251/315, 172, 309, 174, 251/314; 29/157.1; 285/DIG. 16, 423; 137/315; 264/242, 313

[56] References Cited
UNITED STATES PATENTS

| | | | |
|---|---|---|---|
| 2,825,587 | 3/1958 | Barta | 285/DIG. 16 |
| 3,223,111 | 12/1965 | Anderson | 251/315 X |
| 3,271,845 | 9/1966 | Breher | 251/315 X |
| 3,540,693 | 11/1970 | Wise | 251/315 X |
| 3,698,687 | 10/1972 | Kitamura | 251/172 X |
| 3,712,584 | 1/1973 | Wise | 251/315 X |
| 3,807,692 | 4/1974 | Usab | 251/315 |

FOREIGN PATENTS OR APPLICATIONS

| | | | |
|---|---|---|---|
| 1,773,969 | 9/1958 | Germany | 251/172 |

*Primary Examiner*—Harold W. Weakley
*Attorney, Agent, or Firm*—Marvin Bressler; Linn I. Grim; T. J. Morgan

[57] ABSTRACT

A plug valve having a housing molded in place about a pre-formed rotary valve member. The rotary valve member is molded with the mold parting lines lying in a plane containing the axis of the flow passageway. Around the passageway orifice, the mold parting line is eliminated by use of a core insert which forms a recessed region with an annular mold parting line spaced from the orifice. The housing includes a body portion which surrounds the rotary valve member and an annular lip seal member formed as a homogeneous part of the body portion and extending inwardly adjacent the recessed region of the valve member. The inwardly extending portion of the lip seal member has the property of flexing to form a fluid-tight seal when the valve member is in its closed position. On valves having non-threaded end sockets, an annular reservoir is provided between the lip seal member and the socket portion to prevent solvent or cement from contacting the lip seal member when the valve is connected to a pipeline by use of solvent welding.

24 Claims, 12 Drawing Figures

PLUG VALVE

RELATED APPLICATION

This application is a continuation-in-part of my prior application Ser. No. 394,037, filed Sept. 4, 1973.

FIELD OF THE INVENTION

This invention is directed to rotary plug valves, and more particularly to a molded-in-place valve body having a novel lip seal member formed integrally with and as a homogeneous part of the valve body.

BACKGROUND OF THE PRIOR ART

Plug valves have received wide acceptance in many types of liquid flow control applications. Their wide use, particularly in the case of ball valves, is due in no small part to the ease and quickness of opening and closing. By making such valves of plastic materials, protection is afforded against damage by many corrosive fluids which makes such valves attractive for use in many process applications as well as in water lines.

A major problem associated with the manufacture of plastic ball valves of the prior art is that ball seats are formed as separate elements, usually of a special fluorinated hydrocarbon resin such Teflon. The use of separate seating rings adds to the cost and complexity of the valves. Moreover, with separate seating rings, leakage can develop through two paths: one between the rotary ball and the seating ring, and the other between the seating ring and the valve body or ring carrier.

Prior art efforts at providing a plug valve where the housing is molded with the ball in place are discussed in several patents, including U.S. Pat. No. 3,271,845 to Breher. While some forms of valves discussed in this patent and the valves shown in French Pat. No. 1,359,824 (1964) are disclosed as not having separate seat rings or seals, no such valve has found acceptability in the marketplace, apparently because of the lack of an effective sealing capability.

U.S. Pat. No. 3,807,692 to Usab et al discloses a commercially available valve having a housing molded with the ball in place, but in this valve separate seating rings of Teflon are positioned on opposite sides of the ball before the housing is molded. In U.S. Pat. No. 3,223,111 to Anderson, a seat or socket is shown that is molded in place around the plug to form an integral valve and seat unit. This integral valve and seat unit is thereafter placed in a metal housing and subjected to a compression which is stated to create a sufficient force to cause the plastic material of the seat unit to flow and establish, by compression, a seat with the spherical surface of the valve member.

In U.S. Pat. No. 3,712,584 to Wise, the housing is molded in place about a valve ball which is purposely made non-spherical so that the portion of the valve body housing which serves as a socket for the valve ball is formed with a special rigid, raised portion, which in one embodiment is shown to be rigid annular ridges surrounding the valve ball orifices. When the valve ball is rotated to a valve closed position, the rigid, raised portion on the housing frictionally engages and slides against the valve ball to be tightly forced against the valve body portion. To provide a seal, the valve ball must have a very small departure from true roundness which usually requires secondary operations on the ball before the housing is molded in place, thereby adding to the cost of the valve. Also, to the extent a tight fit between the housing and the valve ball is desired, there is required a significant turning force, particularly to break the ball away from its valve open position.

OBJECTS AND SUMMARY OF THE INVENTION

An object of the present invention is to provide a novel plug valve and method where the housing is molded in place from a moldable, non-metallic material and contains as an integral part of the molding operation, lip seal members which eliminate the need for separate seating rings.

Another object is to provide a novel plug valve where the sealing members are formed as flexible lips that are a homogeneous part of the housing. The housing may be made in conventional plastic such as polyvinyl chloride, and surprisingly, it has been found that annular lips can be successfully molded around the surface of the plug in a configuration which has sufficient flexing to provide a leakproof seal throughout an operating life of several thousands of cycles.

A further object of the invention is to provide in a plastic piping system where the pipe sections and the valves are joined by a solvent-cement type joint, a reservoir located adjacent the flexible lip seal member at a position to protect the flexible lip seal from the solvent and cement.

Yet another object is to provide a novel method of making a plug or ball which has mold parting lines controlled in an annular area surrounding the plug through passageway orifice so that the ends of the flexible lip seal members can be formed with the plug serving as one part of the mold without exposure to mold parting lines.

A still further object is to provide a novel core that is used with a preformed plug for controlling the size of the flexible lip seal members to assure a filling out and knitting of the lip while keeping the thickness sufficiently thin to have significant flexing properties sufficient to provide a fluid-tight seal having a long life.

In forming a valve according to the present invention, a rotary plug is pre-formed of a material suitable for use in the mold for injection molding of the housing material. In accord with one aspect of this invention, the plug is molded and finished so that a recessed area around the flow passageway orifice is very smooth and free of mold parting lines. This surface is used to form one side of the flexible lip seal member, and any mold parting line in this area leaves a corresponding line in the flexible lip seal member that will cause the valve to leak. Also, any mold parting line that crosses the sealing surface of the plug when the valve is in the valve closed position will cause the valve to leak. With the lip seal members being formed as a homogeneous part of the housing and having sufficient flexing properties allowing for movements of a few thousandths of an inch, without breakage or permanent deformation, slight variations occurring in plug roundness can be accommodated.

These and other objects and advantages will become more fully apparent from the claims, and from the description when read in conjunction with the drawings.

DETAILED DESCRIPTION

Figure 1:
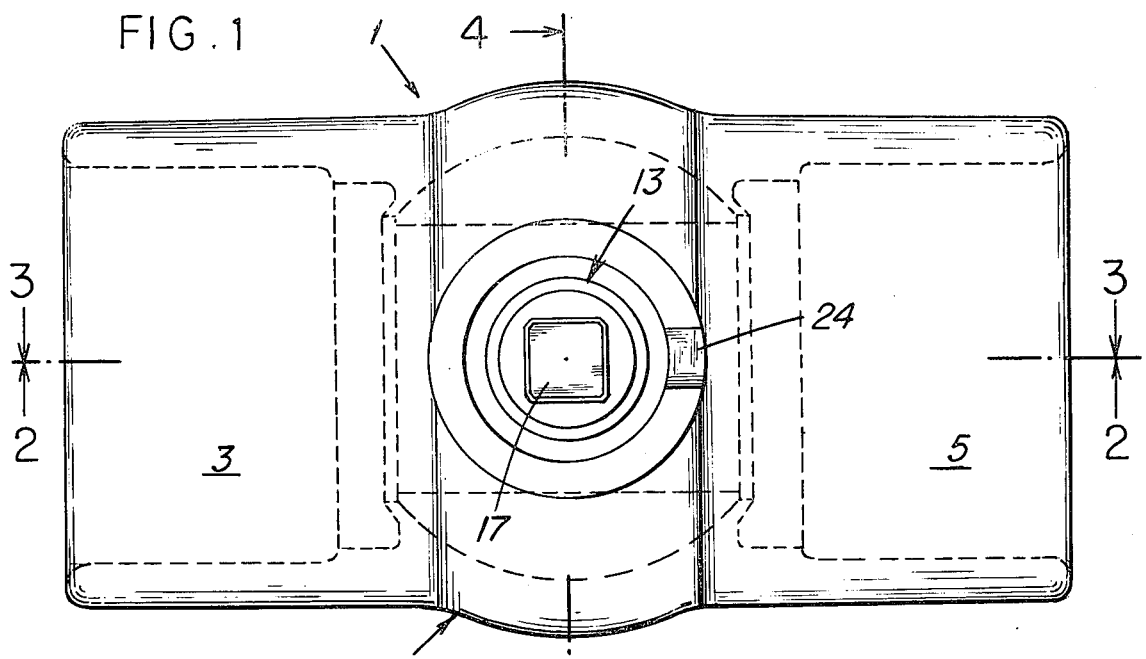
FIG. 1 is a top plan view of a ball valve embodying the present invention.

Turning now to the drawings, the valve 1 includes a housing member generally indicated at 2. The housing includes a pair of cylindrical end sections 3 and 5 which serve as means for connecting the valve to pipe conduits (not shown). Although sections 3 and 5 are preferably a unitary or homogeneous part of the housing 2, they may alternately be separate sections attached to the housing in a suitable manner, such as by threads or solvent welding for example. As those skilled in the art are aware, the cylindrical sections 3 and 5 may be threaded (not shown), either internally or externally, to connect with the ends of fluid pipes which may be of any material conventionally used for pipes. Alternately, the cylindrical socket sections 3 and 5 may be welded, flanged or otherwise connected to such external piping.

The housing 2 also includes a unitary body seal portion in the form of a hollow substantially spherical socket situated intermediate between the cylindrical end sections 3 and 5. The body seal portion 7 includes a lip seal member 6 which will be discussed in greater detail hereinafter.

Figure 2:
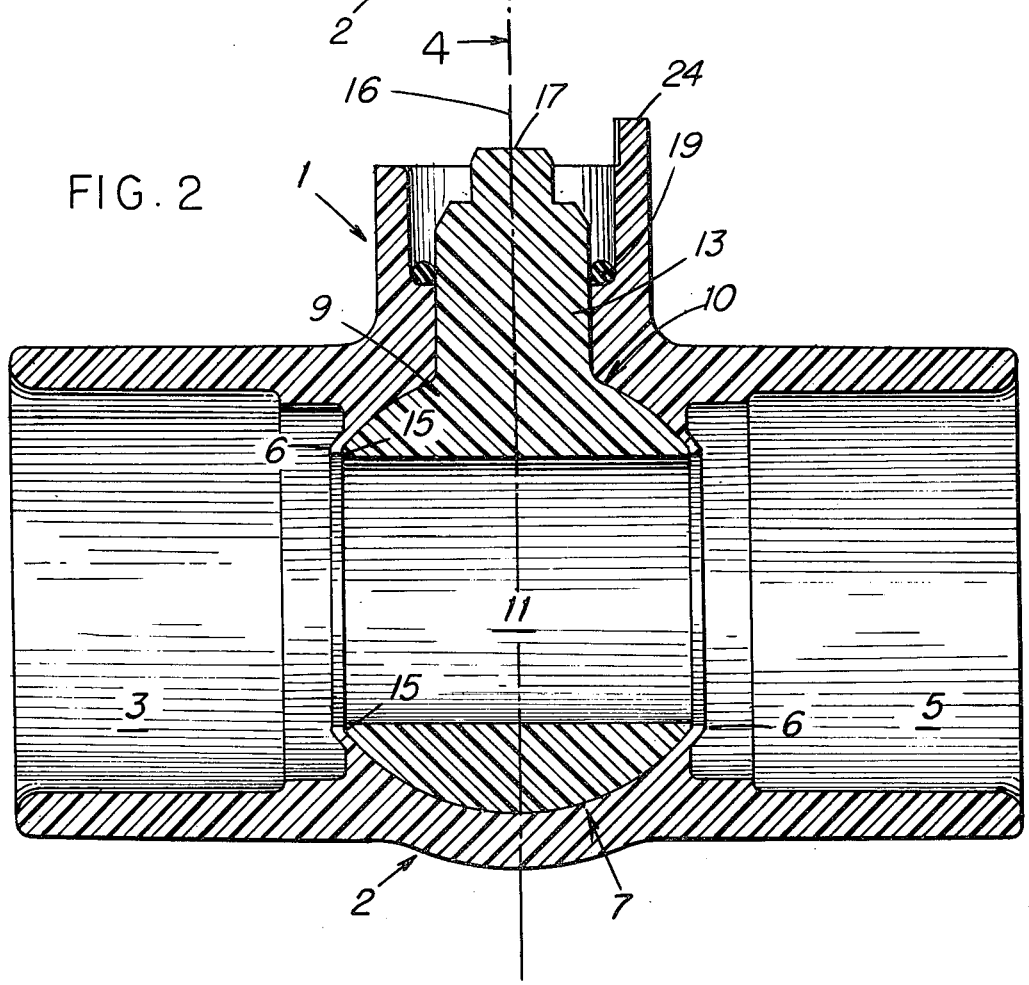
FIG. 2 is an elevation in section showing the valve ball in the valve open position.
Figure 3:
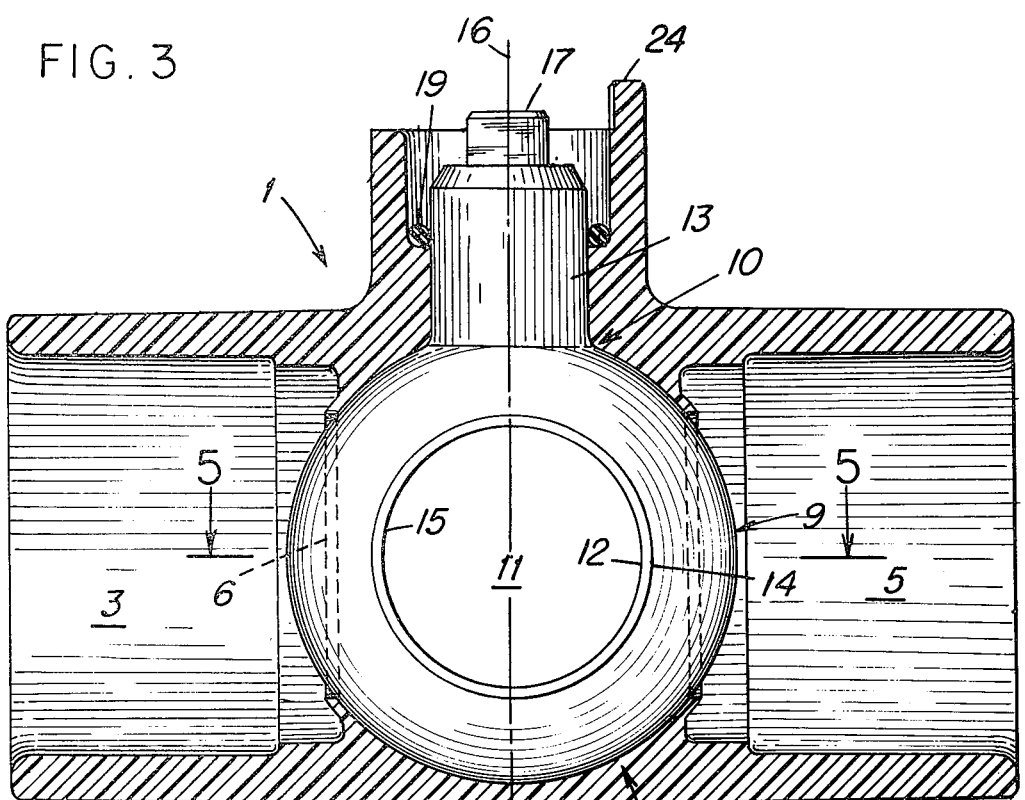
FIG. 3 is a view similar to FIG. 2 but showing the valve ball in a valve closed position.
Figure 4:
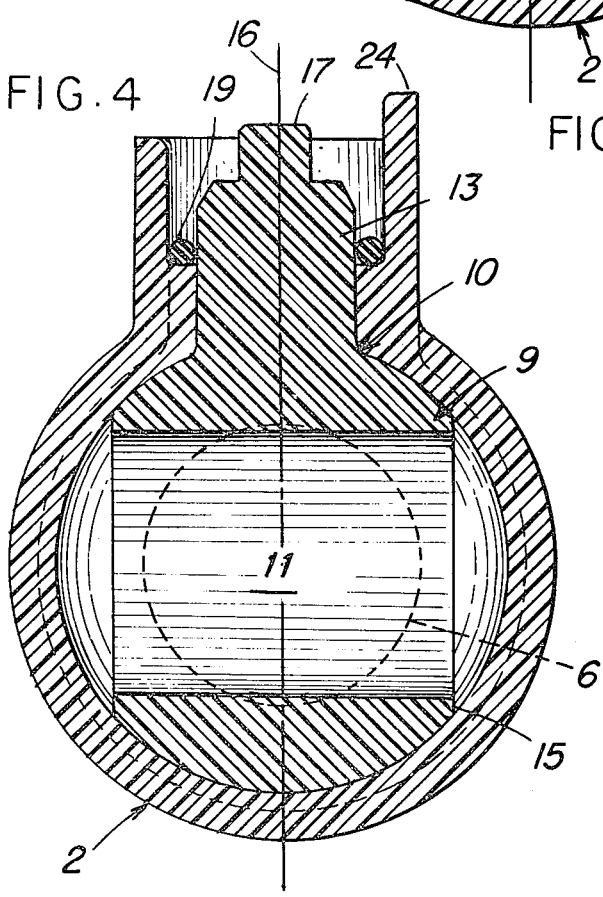
FIG. 4 is an end view in section taken along line 4—4 of FIG. 1.
Figure 5:
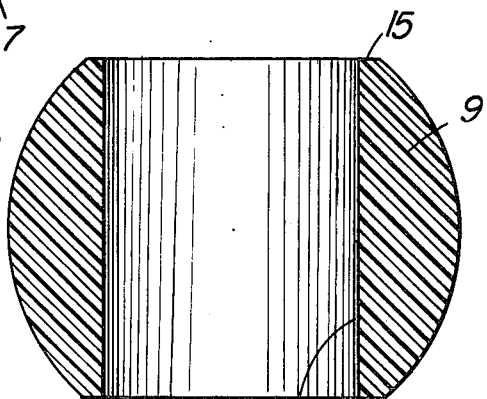
FIG. 5 is a plan view in section of the valve ball taken along line 5—5 of FIG. 3.

Disposed within the housing 2 is a rotary plug which is illustrated as being a ball generally indicated 9. The ball 9 has a circular through opening 11 to communicate between cylindrical sections 3 and 5 when the ball 9 is in the valve open position as illustrated in FIG. 2. A stem 13 is provided to connect the ball 9 with a handle, described below. In the embodiment illustrated in FIGS. 1–8 the stem 13 and ball 9 are integrally connected and the unitary ball-stem is designated generally at 10.

Although the plug valve 1 may be constructed of any suitable material, it is preferable that the material of construction be a plastic or plastics. This is especially true of the housing 2. An injectable plastic provides an excellent method for fabricating the housing 2 as well as providing advantages in terms of the types of fluids that may be controlled by this valve. The plastics contemplated for employment as the materials of construction of the housing 2 all withstand acids, bases and other chemicals that may be employed in process applications. Even the use of water, the most commonly employed liquid, is best accommodated in a plastic housing in that plastics provide excellent corrosion resistance for water. Preferably the plastic employed as the housing 2 of the valve 1 is selected from the group consisting of polyolefins, epoxies, acrylonitrile-butadiene-styrene, nylons, acrylics, polyacetals, polyvinyl plastics and polystyrenes. Of these, a particularly preferred plastic for the housing 2 is polyvinyl chloride.

A preferable method for fabricating the valve is by injection of molten plastic into a mold, which results in the formation of the housing 2, subsequent to the disposition of the ball 9 in the mold. In a preferred embodiment the ball 9 is also constructed of a plastic material. In the preferred embodiment wherein a plastic ball 9 is employed, it is preferable that the ball be constructed of a polyacetal. In one preferred embodiment the polyacetal employed is Celcon, which is a trademark for a polyoxymethylene copolymer. Another preferred material of construction of the ball 9 is chlorinated polyvinyl chloride.

Although plastic is the preferred material of construction for the ball 9, a metallic construction may also be employed. It should be further noted that although the stem 13 is shown as being integral with the ball 9, it is also contemplated that the stem 13 be connected to the ball as for instance by means of a threaded end of the stem connected to a tapped hole in the top of the plug 9. It should be noted that if a two piece ball-stem is employed, it is preferred that the stem be constructed of the same material as the ball.

In operation, the ball valve 1 is opened by rotation, about axis 16, of the handle 20 which transmits a rotational movement through the stem 13 to turn the ball 9 to the open position. The open position is illustrated in FIG. 2.

The ball 9 has a shape which is substantially spherical. Where plug shapes other than balls are used, the exterior surface should define a surface of revolution about the rotational axis of stem 13. At the orifice on each side of the plug or ball, the surface 15 has a recessed area. In the embodiment illustrated in FIGS. 1 through 8, the outer surface 12 of the bore meets with surface 15 which is defined on its outer side by a circle 14, as best shown in FIGS. 3 through 6.

The corner at 14 is preferably rounded to blend with the spherical surface of the ball. The corner at 12 is also preferably rounded in a similar fashion. With the corners at 12 and 14 both being rounded, the surface 15 may be a curved surface rather that flat as illustrated.

The ball 9 is situated in a body seal portion 7 of the housing 2. The body seal portion 7 is in essence a socket for the ball and is formed by molding the housing with the ball in place. The mold, as discussed below, is so shaped as to form a housing as depicted in the drawings. The central opening 11 of the ball 9 is filled with a core and is shaped to form the interior of the housing and particularly the lip member 6, as will be discussed below.

Figure 8:
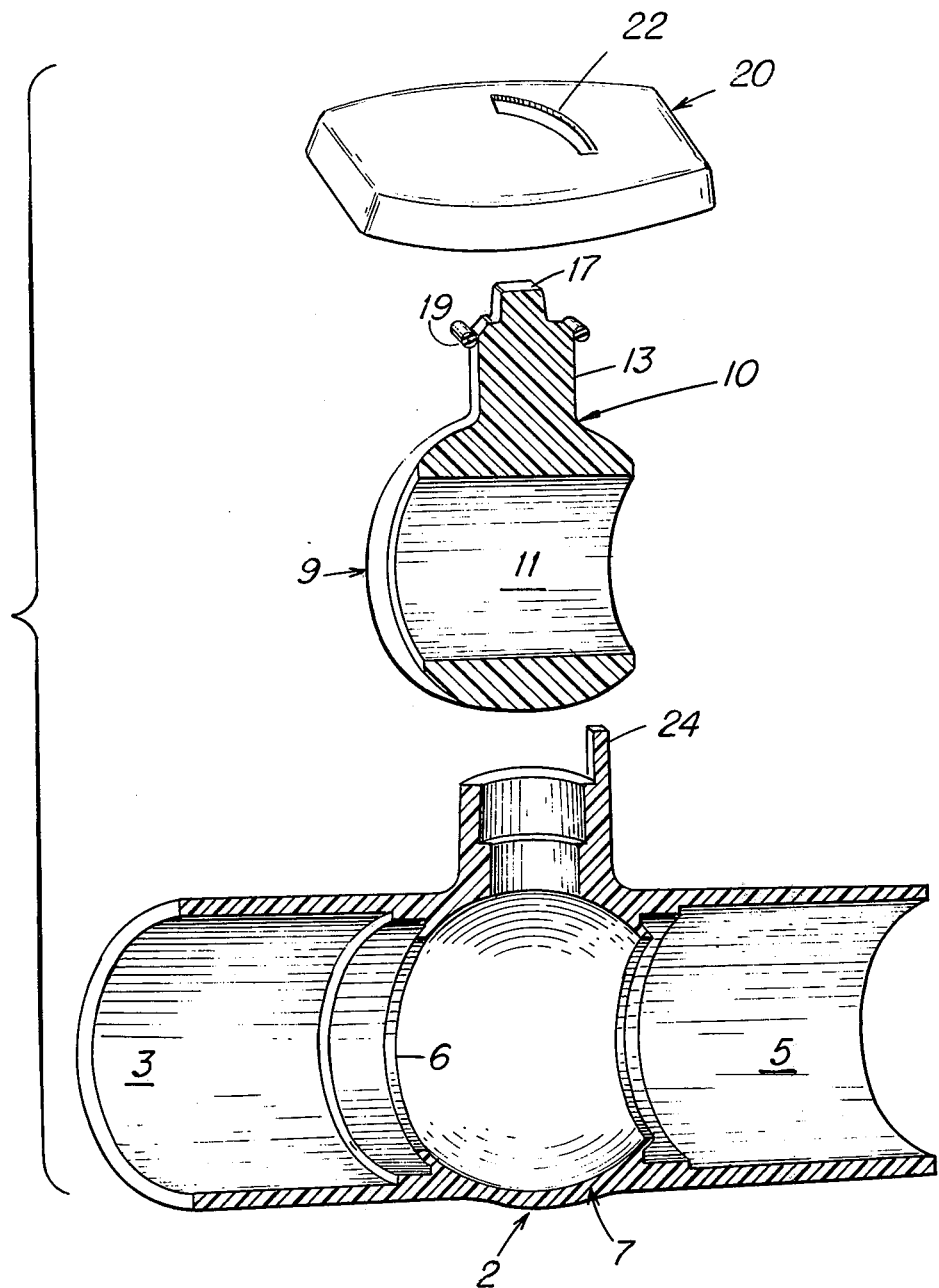
FIG. 8 is an exploded view of the elements forming the ball valve of FIG. 1.

The ball-stem member 10 is turned by a handle 20 which transmits a turning force imparted by an operator. The stem 13 is connected to the handle in any suitable fashion such, for example, as by means of an upper portion of stem 13 which has a square cross section 17. The upper portion is accommodated in an appropriately shaped recess located in the bottom surface of the handle 20 which is illustrated in FIG. 8. The handle 20 is also provided with a curved opening 22 that is adapted to fit over a projection on the housing 24 to limit the rotation of the housing through an angle of 90°. The lower portion of the handle may be provided with an annular skirt which fits over the circular shaft portion of the stem 13 to urge the O-ring 19 into its illustrated position which serves as a stem seal.

Figure 7:
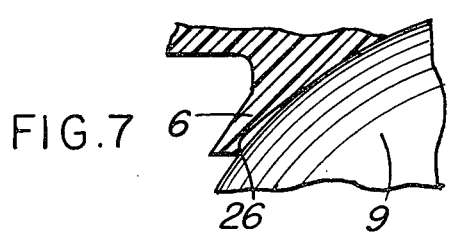
FIG. 7 is a fragmentary end view similar to FIG. 6 but with the valve ball in a closed position similar to that shown in FIG. 3.

The reason that the lip seal member 6 should extend beyond the outer circumference 14 of the ball 9 is that when the ball is rotated to its closed position, the lip member 6 is flexed outwardly causing a force to be exerted between the lip seal member 6 and ball 9. This is illustrated in FIG. 7 which shows the lip seal member 6 in its flexed position. Sealing all fluid pressures including vacuums is effected in large part by the force exerted by lip member 6 on the outer surface of ball 9.

The greatest resistance to leakage is provided under most pressure conditions by the downstream lip seal member 6. The upstream lip seal member is in contact with the fluid in the pipeline which tends to force the downstream side of the ball 9 tightly against the lip seal member 6, providing a primary seal against leakage. At pressures less than atmospheric, the flexural force of the upstream lip member 6 against the outer surface of sphere 9 will provide a positive seal against leakage.

If there is no surface area surrounding the orifice 11 corresponding to the surface 15 which projects, inside the generally spherical shape of ball 9 about its turning axis 16, the lip member would not be formed with an inwardly directed annular portion 26 of the lip seal member 6. The annual portion 26 is forced outwardly over the outer surface of ball 9 when the valve ball is turned to a valve closed position and provides a good fluid-tight seal having a life of over 10,000 cycles of operation.

The amount of flexing required of lip seal member 6 to provide a fluid-tight seal depends somewhat upon the degree of roundness of ball 9. To the extent that the outer surface of ball 9 departs from a true sphere, it is necessary that the lip seal member 6, and particularly the annular portion 26, accommodate the surface undulations in a sealing manner.

When the valve is in its open position, the lip seal member 6 is in the same position as it had been when being formed during the molding operation. There is accordingly no stress on the lip seal member 6 and therefore no distortion due to cold flow. Also, the life of the lip seal members is increased even further.

Because there is no force pressing on the ball 9 by the lip seal member 6 when the valve is in its open position, there is a possibility of a miniscule amount of flow to leak between the lip seal member 6 and the body seal member 7 to the stem member 10. The use of the O-ring 19 serves to prevent leakage at the handle under ordinary conditions of use. O-ring 19 is exposed to far less compressive force and frictional wear than is the case where the sealing ring is located within the internal portion of the housing. Thus, the O-ring 19 does not as easily fail and, moreover, by being disposed on the stem, may be replaced once the handle is removed.

Figure 9:
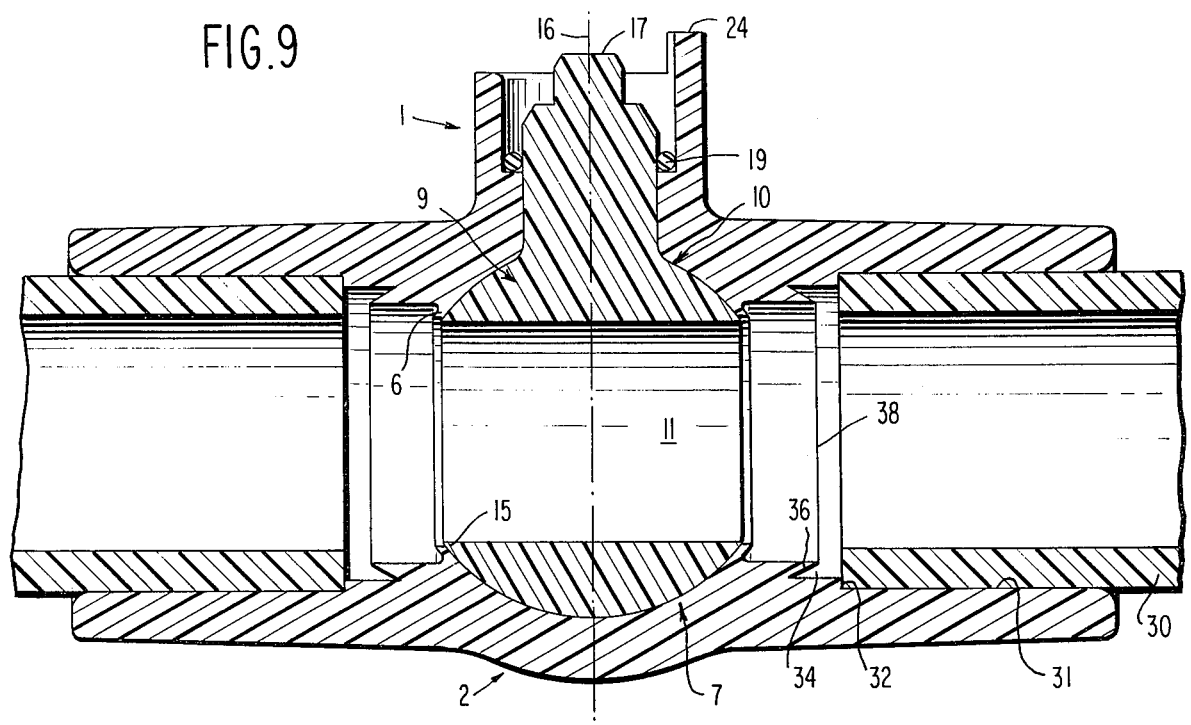
FIG. 9 is an elevation in section of another embodiment showing a pipe section in place and the solvent and cement trap.

Referring now to FIG. 9, a ball valve similar to that illustrated in connection with FIGS. 1 through 8 is illustrated and is shown having a section of pipe 30 inserted in one end channel of the valve. The valve flow channel is provided with a first shoulder 32 that is substantially perpendicular to the flow axis of te valve and against which the butt end of the pipe is adapted to engage. Such a valve is referred to as a socket-end valve.

When pipe 30 is inserted in the end connecting channel of the valve, the valve should be in its open position. A PVC primer is applied to the valve socket side wall 31 and also to the surface on the outer side of pipe 30 which fits into the socket wall 31. Thereafter, a thin coating of a PVC solvent cement is applied to the valve socket side wall 31 and a more generous layer to the outside of pipe 30. The butt end of the pipe is not coated.

It is important to prevent the primer or cement from contacting the flexible lip seal member 6 of the valve of the present invention. For this reason, a reservoir 34 in the form of an annular groove is located between the butt end of pipe 30 which engages shoulder 32 and the lip seal member 6. The reservoir may have a radially inwardly extending wall 36 which is disposed at an acute angle with respect to the flow axis and terminates in an edge 38. This construction thus allows the excess of primer and solvent cement to be trapped in reservoir 34 rather than running up against the edge of lip seal member 6 and thus disturb the flexing properties which are necessary for obtaining an effective seal having a long life.

On those embodiments of the valves where the end connectors are threaded, use of a solvent trap 34 is not normally needed since the seal between the pipe 30 and the end connector 31 is traditionally provided by use of a tape formed of a hydrocarbon resin such as Teflon or a paste.

Figure 10:
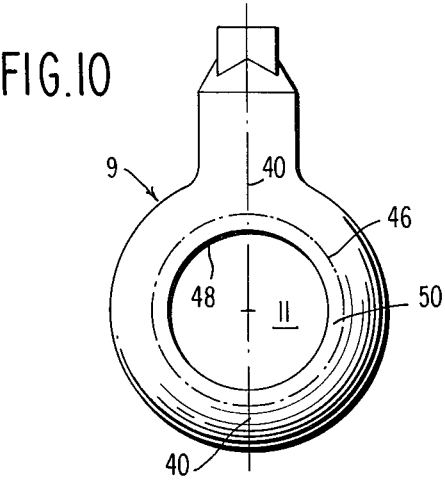
FIG. 10 is an end elevation of the ball of FIG. 9 showing the mold parting lines.
Figure 11:
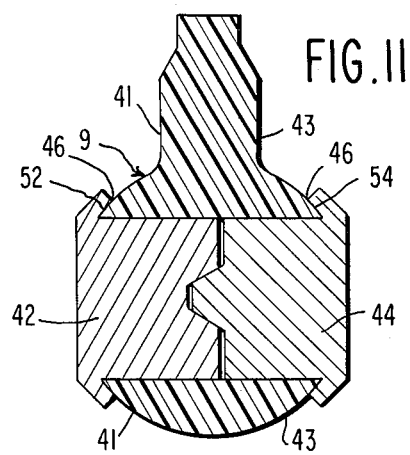
FIG. 11 is a front elevation in section of the ball of FIG. 9 showing mold cores which may be used to produce the mold parting lines.

Referring now to FIGS. 10 and 11, the spherically shaped plug member or ball is shown separately from the housing and in the form in which it is received from the first molding operation. Where the ball 9 molded, it is desirable to have the mold parting lines so located as not to be engaging the lip seal member 6 when the valve is in its closed position. To this end, the parting lines of the cavity halves of the mold lie in a plane including the centerline 40 and the axis of the opening 11 as shown in FIG. 10. With a mold of proper shape, the exterior diameters measured with a common center can be made concentric to within a few thousandths of an inch and the ball surface should be free of imperfections.

Referring now to FIG. 11, a core 42 is used for forming the through opening 11 in ball 9. Core 42 may include a second part 44 and both shaped to fit together at the center portion as is well known in the art. With the use of core parts 42 and 44, the mold parting lines 41 and 43 which are in alignment with centerline 40 as shown in FIG. 10 do not extend inside of the circumference as shown at 46 in the region around the orifice. This avoids a mold parting line between the interior wall 48 of the through opening 11 in ball 9 and the circumference 46. Instead, the entire circumference 46 defines the mold parting line. This providies a surface area 50 over the circumferences 46 and 48 which has a high degree of smoothness and which determines the shape of the inside wall of the lip seal member 6 as shown in detail in FIGS. 6 and 7.

While the ball 9, formed as illustrated and described in connection with FIGS. 10 and 11, has special utility with the valve of the present invention, such a technique may also be advantageously used in forming molded plug elements for other valves which may have different seating rings which also perform a sealing function. By use of this technique, the mold parting lines 41 and 43 can be moved from that portion of the valve which is in contact with the seating ring or lip seal member 6 of the present invention during the time that the valve is in its fully open position, as well as during the time when the valve is in its closed position. Keeping the mold parting lines away from the valve seat reduces the tendency of the sealing ring to to become deformed at the location of the mold parting line. In the valve of the present invention, it is even more important that the mold parting lines are not in the recessed region surrounding the ball orifices since the lip seal member 6 is initially formed during the molding operation and takes a shape determined by the exterior surface of the ball 9. By accurate forming of the ball parts, the mold parting lines 41, 43 and 46 can be made sufficiently small so that secondary operations are not necessary to form the degree of smoothness necessary to allow the molding of the housing in place about the ball 9.

By use of the core elements 42 and 44 as shown in FIG. 11, the interior surface 52 on mold element 42 and 54 on mold element 44 can be shaped so as to provide the desired degree of recess or departure from a spherical shape for ball member 9. This recessed area is important as described in connection with FIGS. 6 and 7 so that the lip seal member 6 will have the annular surface 26 engaging the ball 9 that will require a flexing of the lip seal member 6 when the ball line is turned to the valve closed position as discussed above.

Figure 12:
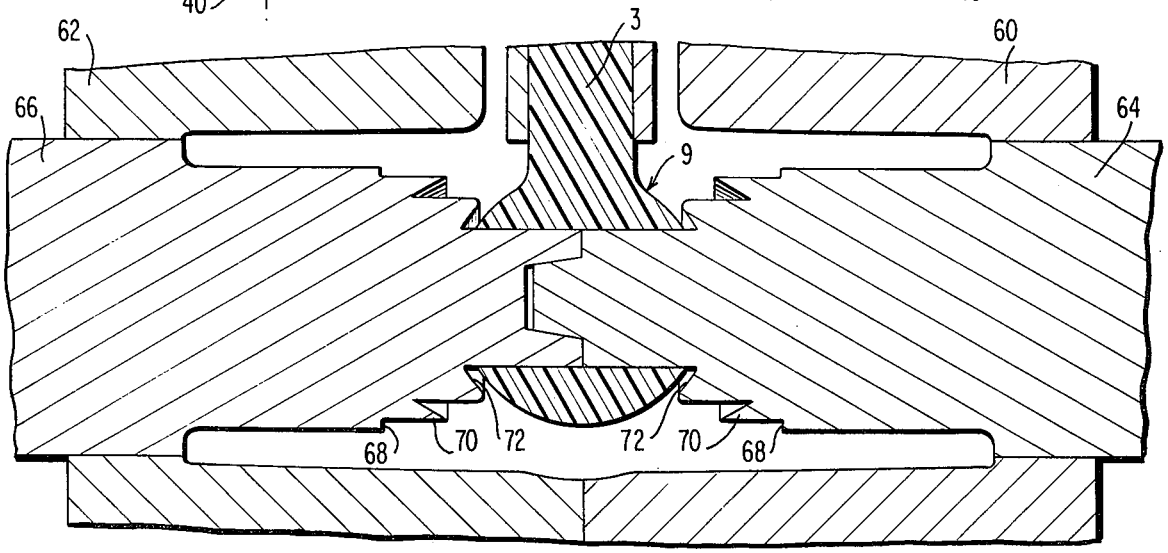
FIG. 12 is a diagrammatic view of a mold for producing the housing of the valve shown in FIG. 9 which is molded in place about the ball shown in FIGS. 10 and 11 with core members shaped to provide the flexible lip seal members.

Referring now to FIG. 12, a suitable mold is diagrammatically shown for forming the housing 2. The mold comprises a first part 60 and a second part 62 which are adapted to provide mold parting lines on opposite sides of the housing which lie in a plane including the turning axis of the valve ball 9. The valve ball 9 is mounted on the ends of a pair of cores 64 and 66. Each core is formed with a first transverse surface 68 which serves to produce the abutment surface 32 in the flow channel against which the end of the pipe is adapted to be positioned. Also, around each of the cores 64 and 66 is an annular spur or projection 70 which is used to form the reservoirs 34 described in connection with FIG. 9.

The lip seal members 6 are formed in the space on opposite sides of the ball 9 between the outer surface of the ball and the surfaces 72 on each of the core members 64 and 66. The space between the ball 9 and surfaces 72 is preferably made as thin as is practicable in order to provide a flexible lip adapted for movement in the flow direction through the valve, as discussed above. The major limiting factor is a requirement that the lip must fill out completely with molten material and the knit line must fuse properly. The thickness of the lip seal member 6 as formed in the space between the surface of ball 9 and surfaces 72 on the core members 64 and 66 is generally chosen to be between about 0.03 and 0.05 inch. The length of the lip seal member as measured along the surface 72 in a direction generally transverse to the direction of fluid flow through the valve may range between about 1/10th and ⅛th inch.

As an example, with a valve ball 9 having a nominal diameter of approximately 0.6 inch, the lip seal member may have a seat thickness ranging between 0.035 and 0.040 inch and a lip length of approximately 0.12 inch. These dimensions do not materially need to be changed with balls of larger diameter, or with other moldable materials identified above. With a small lip thickness, the torque required to move ball 9 from a valve open position toward a valve close position is lower. Also, the extent of recess that is built into the ball 9 in the area 50 (see FIG. 10) surrounding the orifice, and the shrinkage of the lip seal member during molding, will influence this torque requirement.

A valve in accordance with the present invention can be made to have desirable operating characteristics in sizes from ½ to 2 inches or greater without the need for separate seating rings which serve as a sealing member. Instead, the lip seal member 6 can be formed as a homogeneous part of the valve housing of a comparatively non-flexible material such as PVC or CPVC, or of any of the other materials mentioned above, and yet have surprisingly a sufficient flexibility to form a valve which can operate in a leakproof fashion through 15,000 cycles or more.

Figure 6:
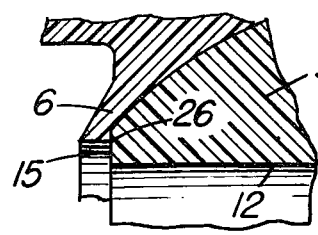
FIG. 6 is a fragmentary end view of a portion of the ball and the lip seal member with the valve ball in the position shown in FIG. 2.

From a manufacturing standpoint, costs can be reduced by carefully molding the ball so that secondary finishing operations are not required to provide a substantially round surface. The ball 9 is formed with an annular recessed area 50 which, when formed in the mold as described in connection with FIG. 12, produces an inner surface that engages ball 9 as illustrated in FIGS. 6 and 7 to form a fluid-tight seal. The amount of recess that is required depends on the physical parameters of the ball in terms of roundness and displacement.

The size and shape of the lip seal members 6 must be selected to produce the required deflection. The maximum thickness as measured in the direction of flow through the valve must not be so large as to limit the flexing properties to an extent where a seal cannot be achieved. On the other hand, the minimum thickness in the direction of fluid flow is determined by the ease of molding since the lip member must be completely filled with molten material and properly knit in order to provide a complete sealing surface which is leak-free.

The extent of the recessed area must be sufficiently small as to not inelastically stress the lip seal members 6 when the valve ball 9 is turned to its valve closed position. When the lip seal members 6 are formed in the manner described, inherently the lip seal members 6 are under very low stress when the valve ball 9 is in the open position, and preferably the stress in the closed position is sufficiently low as to prevent creep which is a function of the product of time and load. Actual flexing of the lip seal members 6 in the direction of fluid flow through the valve has been found to be on the order of magnitude of 0.005 to 0.008 inch when the housing is made of PVC.

By controlling the mold parting lines when forming the plug member as described in connection with FIGS. 10 and 11, it is possible to use the plug member as it is produced by the mold without requiring a secondary finishing operation. The recessed area around the orifice of the ball 9 is controlled by the shape of flanges on the core members 42 and 44. This allows precision control of those dimensions which have an influence on the operating characteristics of the valve.

The precise control of the shape and size of the lip seal members 6 is similarly controlled by fabrication of the core members 64 and 66 which are used in the mold described in connection with FIG. 12. Thus, with properly fabricated molds, the entire valve of the present invention can be made from moldable thermoplastic material without the need for expensive secondary finishing operations. Also, the number of parts needed for fabricating the valve is minimized thereby decreasing the cost of manufacture of the valve.

In the case of valves formed with sockets rather than threaded end connections, provisions are made to prevent the primer and solvent cement from coming into contact with the lip seal members 6. The use of reservoirs 34 as illustrated in FIG. 9 makes it possible to utilize the valve of the present invention with socket end connections even in installations where the valve is mounted in a vertical run of pipe.

The present invention may be embodied in other specific forms without departing from the spirit or essential characteristics thereof. The presently disclosed embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and intended to be covered by Letters Patent is:

1. A valve comprising:
   a unitary housing of moldable non-metallic material provided with inlet and outlet channels having peripheries and including end sections formed as homogeneous parts of said housing for connection to communicating conduits on opposite sides of said valve;
   a plug mounted for rotary movement at a position between said inlet and outlet channels and having a through passageway including an orifice with a periphery smaller than the periphery of the adjoining channel;
   a body seal portion formed as a homogeneous part of said housing and being in sealing engagement with portions of the plug remote from said orifice; and
   an annular lip seal member formed as a homogeneous part of said body seal portion and surrounding said plug orifice, said lip seal member extending radially inwardly from the periphery of said adjoining channel to a position adjacent the periphery of said orifice and being sufficiently thin in the direction of fluid flow through the valve to form a fluid tight seal by causing the radially innermost portion of the lip seal member to flexingly engage an outer surface portion of the plug.

2. The valve as defined in claim 1 wherein the plug contains a recessed annular surface area surrounding said orifice, and wherein the radially innermost portion of said lip seal member extends inwardly to and contacts said recessed area when the valve plug is in the valve open position and flexes over the outer surface of the plug when the valve plug is in the valve closed position.

3. The valve as defined in claim 2 wherein the plug is a ball having a substantially spherical shape and the recessed area of the ball is a flattened surface adjacent the orifice, said flat surface extending between the periphery of said orifice and an outer circle.

4. The valve as defined in claim 3 wherein the lip seal member extends radially inwardly from said adjoining channel by a distance between about 1/10th and ⅛th inch and has a seat thickness of between about 0.03 and 0.05 inch.

5. The valve as defined in claim 4 wherein the innermost portion of the lip seal member extends radially inwardly beyond said outer circle and engages said flattened surface when the valve ball is in the valve open position.

6. The valve as defined in claim 4 wherein the recessed area of the ball is a smooth curved surface free of sharp edges, and the innermost portion of the lip seal member extends radially inwardly to include an annular ridge which faces the recessed area when the valve ball is in a valve open position and which flexes over the ball surface when the valve ball is in a valve closed position.

7. The valve as defined in claim 4 wherein at least one of the inlet and outlet channels includes an end socket adapted to surround a connecting pipe, and a reservoir in the wall of said channel for trapping solvent and cement used for sealingly joining the connecting pipe to said channels, said reservoir being located between the end of said pipe and the adjacent lip seal member.

8. The valve as defined in claim 1 wherein at least one of the inlet and outlet channels includes an end socket adapted to surround a connecting pipe, and a reservoir in the wall of said channel for trapping solvent and cement used for sealingly joining the connecting pipe to said channels, said reservoir being located between the end of said pipe and the adjacent lip seal member.

9. The valve as defined in claim 1 wherein at least one of the inlet and outlet channels includes an end socket adapted to surround a connecting pipe, an abutment surface in said end socket for limiting movement of said pipe toward a lip seal member, and an annular recess in the housing side walls between said abutment surface and the adjacent lip seal member for trapping solvent and cement used for sealingly joining the connecting pipe to said channels.

10. The valve as defined in claim 1 wherein the lip seal member extends radially inwardly from said adjoining channel by a distance between about 1/10th and ⅛th inch and has a seat thickness of between about 0.03 and 0.05 inch.

11. The valve seat as defined in claim 2 wherein the lip seal members extend radially inwardly from said adjoining channels by a distance between about 1/10th and ⅛th inch and have a seat thickness at the innermost portion of between about 0.03 and 0.05 inch.

12. The valve as defined in claim 11 wherein the recessed area of the plug is a flattened surface adjacent the orifice, said flattened surface extending between the periphery of said surface and an outer diameter.

13. The valve as defined in claim 12 wherein the innermost portion of the lip seal member extends radially inwardly beyond said outer diameter and engages said flattened surface when the valve plug is in the valve open position.

14. The valve as defined in claim 13 wherein at least one of the inlet and outlet channels includes an end socket adapted to surround a connecting pipe, and a reservoir in the wall of said channel for trapping solvent and cement used for sealingly joining the connecting pipe to said channels, said reservoir being located between the end of said pipe and the adjacent lip seal member.

15. The valve as defined in claim 1 wherein at least one of the inlet and outlet channels includes an end socket adapted to surround a connecting pipe, and a reservoir in the wall of said channel for trapping solvent and cement used for sealingly joining the connecting pipe to said channels, said reservoir being located between the end of said pipe and the adjacent lip seal member.

16. The valve as defined in claim 1 wherein at least one of the inlet and outlet channels includes an end socket adapted to surround a connecting pipe, an abutment surface in said end socket for limiting movement of said pipe toward a lip seal member, and an annular recess in the housing side walls between said abutment surface and the adjacent lip seal member for trapping solvent an cement used for sealingly joining the connecting pipe to said channels.

17. The valve as defined in claim 1 wherein the plug is formed form a moldable polyoxymethylene and the housing is formed from a moldable polyvinyl chloride.

18. A valve comprising:
a housing of moldable non-metallic material provided with inlet and outlet channels having peripheries;
a plug mounted for rotary movement at a position between said inlet and outlet channels and having a through passageway including an orifice with a periphery smaller than the periphery of the adjoining channel and a recessed annular surface area surrounding said orifice;
a body seal portion formed as a homogeneous part of said housing and being in sealing engagement with portions of the plug remote from said orifice; and
an annular lip seal member formed as a homogeneous part of said body seal portion and surrounding said plug orifice, said lip seal member extending radially inwardly from the periphery of said adjoining channel to a substantially unstressed position adjacent the periphery of said orifice provide a radially innermost portion having an annular configuration contacting said recessed area when the valve plug is in the valve open position, said radial innermost portion having a substantially uniform thickness in the direction of fluid flow, and said lip seal member further being sufficiently thin in the direction of fluid flow through the valve to form a fluid-tight seal by causing the radially innermost portion of the lip seal member to be displaced in a direction substantially parallel to the direction of fluid flow through the adjacent orifice and to flexingly engage an outer surface portion of the plug when the plug is in valve closed position.

19. The valve as defined in claim 18 wherein the plug is a ball having a substantially spherical shape and the recessed area of the ball is a flattened surface adjacent the orifice, said flat surface extending between the periphery of said orifice and an outer circle.

20. The valve as defined in claim 19 wherein the lip seal member extends radially inwardly from said adjoining channel by a distance between about 1/10th and ⅛th inch and has a seat thickness of between 0.03 and 0.05 inch.

21. The valve as defined in claim 20 wherein the innermost portion of the lip seal member extends radially inwardly beyond said outer circle and engages said flattened surface when the valve ball is in the valve open position.

22. The valve as defined in claim 20 wherein the recessed area of the ball is a smooth curved surface free of sharp edges, and the innermost portion of the lip seal member extends radially inwardly to include an annular ridge which faces the recessed area when the valve ball is in a valve open position and which flexes over the ball surface when the valve ball is in a valve closed position.

23. The valve as defined in claim 20 wherein at least one of the inlet and outlet channels includes an end socket adapted to surround a connecting pipe, and a reservoir in the wall of said channel for trapping solvent and cement used for sealingly joining the connecting pipe to said channels, said reservoir being located between the end of said pipe and the adjacent lip seal member.

24. The valve as defined in claim 18 wherein at least one of the inlet and outlet channels includes an end socket adpated to surround a connecting pipe, and a reservoir in the wall of said channel for trapping solvent and cement used for sealingly joining the connecting pipe to said channels, said reservoir being located between the end of said pipe and the adjacent lip seal member.

* * * * *